UNITED STATES PATENT OFFICE.

OSKAR KALTWASSER AND HUGO JAESSCHIN, OF BERLIN, GERMANY, ASSIGNORS TO ACTIEN-GESELLSCHAFT FÜR ANILIN FABRIKATION, OF SAME PLACE.

BLACK DISAZO DYE.

SPECIFICATION forming part of Letters Patent No. 683,120, dated September 24, 1901.

Application filed July 12, 1901. Serial No. 68,000. (No specimens.)

*To all whom it may concern:*

Be it known that we, OSKAR KALTWASSER and HUGO JAESSCHIN, of Berlin, in the Kingdom of Prussia, German Empire, have invented new and useful Improvements in the Production of Mordant-Dyeing Disazo Coloring-Matter; and we do hereby declare that the following is a full, clear, and exact description thereof, which will enable others skilled in the art to which it appertains to make and use the same.

We have found that a valuable disazo dyestuff may be produced by first combining 1.8-amidonaphthol-4-sulfonic acid in an acid solution with alpha-diazo-naphthalene and coupling, further, the monoazo dyestuff thus obtained in an alkaline solution with the diazo compound of 4-chloro-2-amidophenol sulfonic acid. The dyestuff thus produced dyes wool directly from an acid-bath black shades of a rather sufficient fastness, which shades by a subsequent treatment with an alkali-bichromate are deepened and assume at the same time an extraordinary fastness to soap and to milling. It is easily to be understood that this property is unexpected and remarkable in a coloring-matter containing two sulfo groups.

For the production of the 4-chloro-2-amidophenol sulfonic acid employed as a dyestuff component we proceed as follows: Twenty-five kilos of 4-chloro-2-nitrophenol are heated with a solution of one hundred kilos of sodium bisulfite and five hundred liters of water in a vessel combined with a reflux-condenser, and the mixture is kept boiling until the 4-chloro-2-nitrophenol has disappeared, a clear solution thus being formed. One hundred kilos of hydrochloric acid (specific gravity 12° Baumé) are now added thereto and the mass is boiled for some time more in order to expel the excess of sulfurous acid. On refrigeration the 4-chloro-2-amidophenol sulfonic acid separates as a crystalline mass, easily soluble in boiling water, hardly soluble in cold water or in alcohol. Its sodium salt crystallizes from hot water in the form of shining leaflets.

In order to produce the new disazo dyestuff which forms the subject of the present application, we proceed as follows: 14.3 kilos of alpha-naphthylamin are dissolved in water on addition of sixty parts of hydrochloric acid (specific gravity 12° Baumé) and are diazotized in the well-known way with the aid of seven kilos of sodium nitrite. The diazo solution thus obtained is run into a neutral solution obtained by dissolving in water twenty-four kilos of 1.8-amidonaphthol-4-sulfonic acid with the addition of the theoretical amount of sodium carbonate. The mixture is stirred until the combination is completed, and forty-five kilos of sodium carbonate are then added thereto in order to dissolve the monoazo dyestuff thus formed. A diazo solution obtained by treating 23.5 kilos of the above-mentioned 4-chloro-2-amidophenol sulfonic acid in the well-known way with sixty parts of hydrochloric acid (specific gravity 12° Baumé) and seven parts of sodium nitrite is allowed to run thereto, and the mass is stirred for about twelve hours more until the formation of the new disazo dye is completed. The dye is then precipitated by means of common salt, and it is filtered, pressed, and dried. It forms in the dry state a dark powder, hardly soluble in alcohol, easily soluble in water, forming dark-blue solutions. The aqueous solution remains unchanged on the addition of a small quantity of caustic-soda lye; but it is precipitated by an excess of this agent. The dye is likewise precipitated in the form of bluish-black flakes by the addition of a mineral acid. It dissolves easily in concentrated sulfuric acid to a dark-blue solution, from which it will readily separate on dilution with ice-water. It produces on wool from an acid-bath black shades, which by a subsequent treatment with an alkali-bichromate are deepened and assume at the same time an extraordinary fastness to soap and to milling.

The result is not materially changed if for the above-described 4-chloro-2-amidophenol sulfonic acid the isomeric sulfo-acid is substituted, which may be obtained by introducing one part of 4-chloro-2-amidophenol into four parts by weight of sulfuric acid monohydrate, heating the mixture gently for some time, and finally pouring it into ice-water.

Having thus described our invention and in what manner the same is to be performed, what we claim as new is—

The new disazo dye obtained by first combining 1.8-amidonaphthol-4-sulfonic acid in an acid solution with alpha-diazo-naphthalene and coupling further the monoazo dyestuff thus obtained in an alkaline solution with the diazo compound of a 4-chloro-2-amidophenol sulfonic acid, the dye forming in the dry state a dark powder, hardly soluble in alcohol, easily soluble in water to dark-blue solutions; the aqueous solution remaining unchanged on the addition of a small quantity of caustic-soda lye, but being precipitated by an excess of this agent; the dye being likewise precipitated from its aqueous solution in the form of bluish-black flakes by the addition of mineral acids; dissolving easily in concentrated sulfuric acid to a dark-blue solution, being separated from this solution by dilution with ice-water in the form of bluish-black flakes; producing on wool from an acid-bath black shades which by a subsequent treatment with an alkali-bichromate are deepened and assume at the same time an extraordinary fastness to soap and to milling.

In witness whereof we have hereunto signed our names, this 21st day of June, 1901, in the presence of two subscribing witnesses.

OSKAR KALTWASSER.
HUGO JAESSCHIN.

Witnesses:
  WOLDEMAR HAUPT,
  HENRY HASPER.